Figure 1:
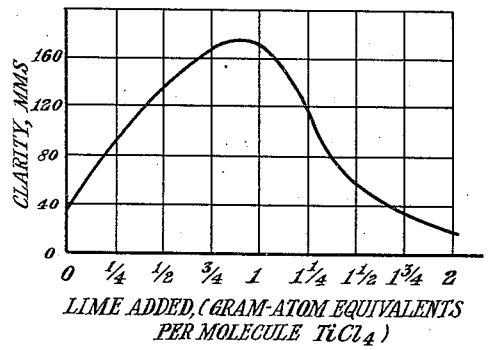

June 9, 1942.  J. BARKSDALE ET AL  2,285,485
PROCESS FOR THE PRODUCTION OF TITANIUM DIOXIDE
Filed Nov. 3, 1938  2 Sheets-Sheet 1

INVENTORS.
JELKES BARKSDALE
WALTER W. PLECHNER
BY Charles F. Kaegebehn
ATTORNEY.

June 9, 1942. J. BARKSDALE ET AL 2,285,485
PROCESS FOR THE PRODUCTION OF TITANIUM DIOXIDE
Filed Nov. 3, 1938    2 Sheets-Sheet 2

INVENTOR.
JELKES BARKSDALE
BY   WALTER W. PLECHNER
Charles F. Kaegebeh
ATTORNEY.

Patented June 9, 1942

2,285,485

UNITED STATES PATENT OFFICE 2,285,485

PROCESS FOR THE PRODUCTION OF TITANIUM DIOXIDE

Jelks Barksdale, New York, N. Y., and Walter W. Plechner, Metuchen, N. J., assignors to National Lead Company, New York, N. Y., a corporation of New Jersey Application November 3, 1938, Serial No. 238,542

10 Claims. (Cl. 23—202)

The present invention relates to those methods for the hydrolytic precipitation of hydrous titanium oxide from hydrolyzable titanium salt solutions which include the use of nuclei or nucleating compositions. It has especial reference to the preparation and use of a new type of nucleating composition consisting essentially of titanium complexes.

The literature of the prior art, consisting of both patent and technical publications, is replete with descriptions of methods for the preparation of many different types of nuclei and nucleating compositions. This literature is too varied and too extensive to permit us here to give a discussion thereof but those skilled in this art being familiar with these publications will readily appreciate the novelty and value of the present invention.

Although the several objects of the present invention will become apparent from this description the primary objects include methods for the preparation of a new type of nucleating titanium composition, the novel nucleating compositions themselves and their use in the hydrolysis of titanium salt solutions.

According to the invention a titanium tetrachloride solution is partially neutralized with an alkaline neutralizing agent without causing any precipitation of titanium compounds, the partially neutralized solution is then heat-treated to develop its nucleating properties and the resulting composition used as a nucleating agent for the thermal hydrolysis of titanium salt solutions. The efficiency of the nucleating compositions and the quality of the titanium dioxide pigments obtained from processes embodying the invention depend upon certain factors, principally:

I. Concentration of titanium in the titanium tetrachloride solution.

II. Degree of neutralization of the titanium tetrachloride solution.

III. Temperature and time of the heat-treatment of the partially neutralized titanium tetrachloride solution.

IV. Manner of mixing the heat-treated solution with the hydrolyzable titanium salt solution.

V. Concentration of titanium in the hydrolysis mixture of nucleating composition and titanium salt solution.

VI. Basicity, i. e., ratio of titanium to acid in the hydrolysis mixture of titanium salt solution and nucleating composition.

VII. Quantity of nucleating composition and concentration of titanium therein to be employed in the hydrolysis of the titanium salt solution.

These factors will now be explained so as to enable those skilled in this art to practice the invention.

I. CONCENTRATION OF TITANIUM IN THE TITANIUM TETRACHLORIDE SOLUTION

For the best results in the practice of the invention the titanium tetrachloride solution prior to the partial neutralization should contain between about 250 grams and about 400 grams per liter, calculated as titanium dioxide, $TiO_2$. In accordance with usage in the art, the concentrations of titanium solutions are expressed as grams per liter, or per cent as the case may be, of titanium dioxide to indicate the titanium concentration and of hydrochloric acid or of sulfuric acid to indicate the concentration of the acid radical. The acid concentration is, of course, both free acid and that combined with the titanium to form the titanium salt in solution. To obtain such a solution the ordinary anhydrous titanium tetrachloride of commerce will serve as a starting material. For instance, a known weight may be slowly poured onto an equal weight of cracked ice exercising care, after the ice has melted, that the temperature is held below about 70° C., preferably about 40° C., in order to avoid precipitation of titanium compounds due to thermal hydrolysis occasioned by the heat of dilution. Following this procedure, solutions may be obtained which contain about 250 grams to about 400 grams per liter of titanium, calculated as $TiO_2$, the preferrer range being 325–375 grams per liter. It may be found at times that the solution will contain somewhat less hydrochloric acid than would be expected from the theoretical composition, $TiCl_4$. The solution to be prepared for hydrolysis may be treated with a reducing agent, e. g., zinc dust, in order to reduce any oxidizable impurities which may be present in the solution. The reducing treatment should preferably be carried out until the solution has faint purplish color, indicating that a small amount of titanium of the order of 1 to 3 grams per liter, calculated as titanium dioxide, $TiO_2$, has been converted to the trivalent state in order to prevent these oxidizable impurities from reoxidizing during subsequent stages in the process and thus becoming harmful. Thereafter, if necessary, the solution may be filtered to remove any solids present either as impurities or those resulting from the dilution. This solution then is suitable for use as furnishing the bulk of the titanium dioxide to be hydrolyzed utilizing the nucleating compositions as described in this specification. It also is suitable for the preparation of these nucleating compositions, i. e., it may be partially neutralized (section II), diluted (section VII), heat-treated (section III), and then utilized as a nuclear solution for the hydrolysis of titanium chloride or sulfate solutions as is fully described herein.

II. DEGREE OF NEUTRALIZATION OF THE TITANIUM TETRACHLORIDE SOLUTION IN THE PREPARATION OF NUCLEAR SOLUTIONS

The amount of alkaline neutralizing agent to be added to bring about the desired degree of neutralization according to the invention may conveniently be expressed as hydrochloric acid mol equivalents per molecule of titanium tetrachloride present in the solution. That is to say, if one hydrochloric acid mol equivalent of alkaline neutralizing agent is to be added, then the ratio of HCl to $TiO_2$ in the solution will be reduced from about 4:1 to about 3:1.

It has been found according to the invention that the best results i. e., titanium dioxide pigments possessing the optimum tinting strength and best color, as well as the highest nucleating efficiency are obtained when a sufficient amount of alkaline neutralizing agent is added to the titanium tetrachloride solution which is to be converted to nuclei to neutralize between about 0.75 to about 1.25 hydrochloric acid mol equivalents per mol of titanium tetrachloride. Thus, the partially neutralized solution will contain between about 2.75 and 3.25 hydrochloric acid molecules equivalents, free and combined with titanium, per molecule of titanium, calculated as $TiO_2$.

The most satisfactory results are obtained when adding an amount of alkaline neutralizing agent substantially sufficient to neutralize one hydrochloric acid mol. The resulting partially neutralized solution will, therefore, be a basic titanium chloride solution. By a basic titanium solution, as is generally understood in the art, is meant a solution containing less acid than would be normally associated with quadrivalent titanium, assuming complete hydrolysis. Thus a normal titanium tetrachloride contains four mols of hydrochloric acid for each mol of titanium, whereas a basic solution contains less than four mols of acid per mol of titanium or titanium dioxide. It is surprising to note that this neutralization does not render the titanium tetrachloride solution more susceptible to precipitation during the subsequent heat treatment. As a matter of fact, it has been found that when a titanium tetrachloride solution has been partially neutralized according to the invention and subsequently heat-treated in the manner to be described the resulting nucleating composition is more stable, that is, exhibits less tendency to precipitate titanium compounds than a similar titanium tetrachloride solution which has not been partially neutralized. The partially neutralized solutions of the invention remain clear for a long time on standing, whereas a titanium tetrachloride solution which has not been neutralized tends to precipitate titanium compounds out of solution during or within a short time after the heat treatment. This is evidenced by a clouding of the solution. The cloudiness increases progressively until the solution appears milk-white and finally precipitates the titanium compound out of suspension as a white solid. We are not able to furnish any explanation of why a partial neutralization should in effect produce a greater stability, but such is the observed phenomenon.

The stability of these partially neutralized titanium tetrachlorides is shown on Graph 1 of Fig. 1 where the ordinates represent clarity of the heat-treated nuclear solutions in terms of readings obtained on a turbidimeter, subsequently to be described and the abscissae represent the degree of neutralization in terms of gram-atom equivalents of lime added per molecule of titanium tetrachloride.

The composition of the alkaline neutralizing agent is of minor consequence. According to the invention, we may use alkaline-reacting alkali metal compounds, such as the oxides, hydroxides, carbonates, etc., of sodium, potassium, and the other alkali metals. If desired, the oxides and hydrosulphides, as well as the sulphites may also be used. Ammonia, either as a gas or in aqueous solution as ammonium hydroxide may be employed. The alkaline-reacting alkaline-earth metal compounds are also useful. Thus, the oxides, hydroxides, and carbonates of calcium, barium, strontium, and magnesium may also be employed; it being understood that the chlorides of such metals are water-soluble and remain in solution in the partially neutralized titanium tetrachloride solution. Lime, CaO, slaked or unslaked, is a particularly useful and cheap neutralizing agent, and we have employed it with excellent results in the practice of our invention. It will be appreciated that for every gram-atom of chlorine to be reacted with lime, CaO, 0.5 gram-mols of lime will be added according to the gram-weight ratio of 35.5 (Cl):56/2(CaO)::1:0.79, the weight ratio then being 1:0.79.

No special precautions as to temperature or manner of mixing the alkaline neutralizing agent with the titanium tetrachloride solution need be observed, but the alkaline neutralizing agent in the form of an aqueous solution or in the form of a powder, if the neutralizing agent is, like lime, substantially insoluble in water, may be added directly to the titanium tetrachloride solution.

Figure 2:
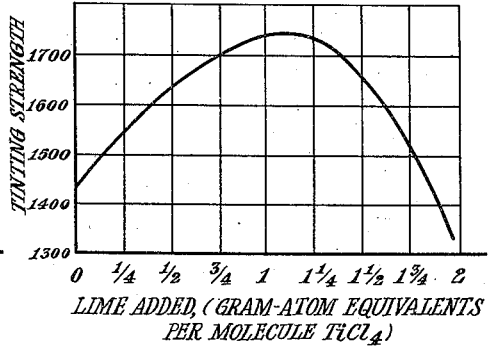

The influence of degree of neutralization of the nuclear solution upon the tinting strength of the calcined pigment obtained by utilizing our nuclei to hydrolyze the titanium salt solution and washing and calcining the product is shown on Graph 2, of Fig. 2 where the ordinate represents tinting strength as obtained by the well-known Reynolds method and the abscissa represents the degree of neutralization expressed as gram-atom equivalents of lime per gram-mol of titanium tetrachloride.

The importance of the partial neutralization step in the preparation of the nuclear solution is immediately apparent from an examination of the aforementioned Figures 1 and 2, a maximum appearing in both the clarity and, of the greatest practical significance, in the tinting strength curves. Prior to the present invention no such result has been described. In fact the maximum appearing in the clarity curve (a maximum in stability of the heat-treated solution) is quite contrary to what might be expected; it generally being assumed, other factors being equal, that the stability of titanium solutions progressively decreases with increasing basicity.

III. TEMPERATURE AND TIME OF THE HEAT TREATMENT OF THE PARTIALLY NEUTRALIZED TITANIUM TETRACHLORIDE TO FORM THE NUCLEAR SOLUTION

After the neutralizing treatment which may be followed by a reducing treatment as above described and, if necessary, a filtration, the titanium tetrachloride solution is ready for dilution and the heat treatment. Filtration may conveniently follow the dilution.

Since the nucleating efficiency, as well as the tinting strength and color of titanium dioxide pigments obtained from processes embodying the present invention are to a certain extent dependent upon the heat treatment, this step is of considerable importance. Preferably the partially neutralized solution should be heated between about 80 to 90° C. for about 10 minutes taking about 15 minutes to raise the temperature of the solution from room temperature to about 85° C. Time and temperature are to a certain extent reciprocal and it has been found that nucleating compositions possessing good properties are obtained when heating for a longer period of time at a lower temperature, for example, at 70° C. to 75° C. for one hour. The proper heat treatment may be determined roughly by observing the opalescence of the heat-treated titanium tetrachloride solution. For such observation of clarity opalescence, it is convenient to employ a turbidimeter of the extinction type and such readings represent the height in millimeters of a column of nuclear suspension just required to extinguish the light from a constant source. The values are relative. Thus, it has been found according to the invention that a solution should be heated at a sufficient temperature and for a sufficient length of time to produce a degree of opalescence measured on the turbidimeter equivalent to the degree of opalescence obtained by heating the solution between about 80 to 90° C. for about 10 minutes.

When the heat-treatment has produced but not exceeded the desired degree of opalescence as measured by the turbidimeter the solution has attained its maximum nucleating properties and is ready for use in a subsequent hydrolysis of a titanium salt solution.

Figure 3:
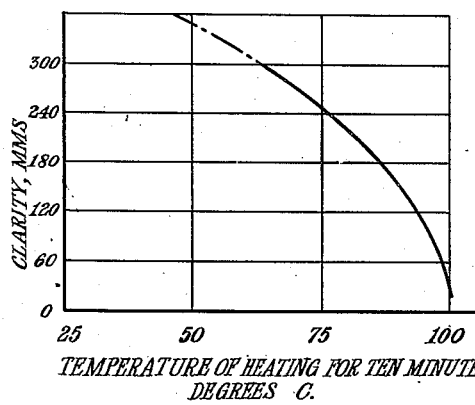
Figure 4:
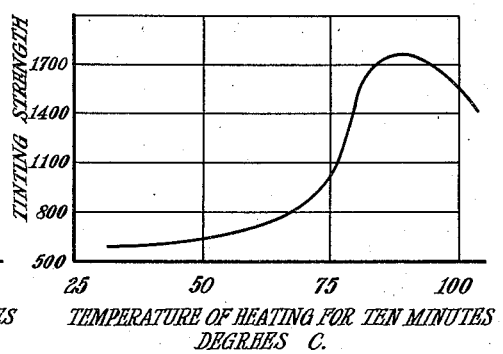

Curve 3 of Fig. 3, and curve 4 of Fig. 4 illustrate the effect of the heat treatment and constitute, for those skilled in this art, a means of determining the proper time and temperature of the heat treatment. The ordinates of Fig. 3 express clarity in terms of turbidimeter readings, while the abscissae of Fig. 3 express varying temperatures of heating for 10 minute periods. It will be observed that the higher the temperature of the 10 minute heating period, the lower is the clarity. The ordinates of Fig. 4 express tinting strength as measured by the Reynolds method while the abscissae of Fig. 4 express varying temperatures of heating for 10 minute periods. It will be noted from Fig. 4 that products possessing the highest tinting strength are obtained when the heat treatment is carried on for 10 minutes from about 80° to about 90° C., which heat treatment corresponds to the degree of clarity, or opalescence, which may be found by projection upward from the abscissa at 80° and 90° C. to the curve and then to the clarity ordinate on Fig. 3.

In the turbidimeter which we have used the opalescence, under optimal conditions, was between about 150 and 200 mm. depth of solution require for extinction of the light source. This was a Jackson type turbidimeter with a 3.5 volt 0.5 ampere General Electric galvanometer lamp light source. Because of the relatively low turbidity of our nuclear solutions it was necessary to cover the lamp with four sheets of white paper (16 pound sulphite).

Thus, it will be seen that our invention is not to be limited in terms of specific temperature and time but rather includes broadly a heat treatment which shall be sufficient to develop the optimum nucleating efficiency of the nucleating composition as indicated by the degree of clarity.

We cannot state definitely the constitution of the nucleating composition in terms of physical chemistry, but we believe its composition results from progressive changes of state from that condition in which the titanium was present in the original solution of titanium tetrachloride. That is to say, in such solutions as are employed in the present invention the titanium tetrachloride is to be regarded as in a crystalloidal solution. The partial neutralization, if it does not change the titanium compounds in solution from crystalloidal to colloidal condition, in all probability disrupts the metastable equilibrium of the solution by causing the titanium complex in solution to grow larger by olation and oxolation (phenomena associated with hydrolysis by neutralization), the neutralization being arrested before olation or oxolation can proceed to such an extent that precipitation would occur, the titanium complexes remaining possibly partially in the crystalloidal and partially in the colloidal state or intermediate between what might be recognized as strictly crystalloidal or colloidal conditions. The heat treatment causes further physico-chemical changes of the titanium complexes to occur. These changes may also be regarded as olation and oxolation, whereby the size of the titanium complex becomes larger with accompanying loss of the molecules present as aquo groups. The nucleating composition may be regarded as consisting of Werner complexes in which the titanium in the cation is associated possibly by physical or chemical bonds of association or both, with hydroxyl and aquo and possibly also with one or more chlorine anions. We believe this state to be evidenced by the degree of opalescence which is produced in the heat treatment. When this state has been reached the titanium complexes, while still dispersed, cannot be separated from the liquid except by the usual involved methods employed to separate colloid particles from liquid, e. g., dialysis. They cannot be removed by ordinary means such as filtration and consequently are not definite, macroscopic particles, which for example, may be removed from the liquid by filtration and washed.

By the term titanium complex as herein employed is meant the micelle which is produced as a result of the change from relatively unassociated crystalloidal condition. Its composition cannot be stated exactly. In all probability it consists of a complex micellar arrangement where titanium constitutes a nuclear cation associated with anions which may be either chlorine or hydroxyl groups as well as with aquo (water) groups, bound by physical as well as chemical bonds of association. A clear picture of such complex arrangements which in colloidal chemistry are referred to as micelles is given by A. W. Thomas in his book "Colloid Chemistry" published by McGraw-Hill Book Co., Inc., year 1934, chapter 7, page 141, et seq.

To those skilled in this art it will be at once evident that not only the manner of preparing the nucleating composition is new but the composition itself is also novel. As distinguished from those procedures of the prior art where neutralizing agents are added to precipitate orthotitanic acid from titanium tetrachloride solutions which orthotitanic acid is redissolved in hydrochloric acid solutions, no precipitation occurs whatever in the practice of the present invention. Furthermore, the manner of preparation of our nucleating compositions is not to be confused with other procedures involving only a heat treatment of a titanium solution. Similarly, it is apparent that our nuclear compositions are not obtained by the re-solution of colloidal hydrous titanium oxides such as obtained when a titanium solution is poured into hot water or a hot dilute titanium solution. We have found that the high efficiency of the nucleating composition and the high tinting strength and good color of the titanium dioxide pigments obtained result from the conjoint effect of both the partial neutralization coupled with the heat treatment.

When the heat treatment is completed as indicated by the development of the proper degree of opalescence, the nucleating composition is ready for use.

IV. MANNER OF MIXING THE HEAT TREATED NUCLEAR SOLUTION WITH THE HYDROLYZABLE TITANIUM SALT SOLUTION

The novel nucleating compositions of the present invention are particularly adaptable for the hydrolysis of titanium tetrachloride solutions but they may be employed as well for the hydrolysis of other hydrolyzable titanium salt solutions, for example, titanium sulfate solutions. When hydrolyzing a titanium tetrachloride solution using the nucleating compositions of the present invention the manner of mixing is not particularly important but we have found it convenient to add the nucleating composition to the titanium tetrachloride solution to be hydrolyzed. On the other hand, if the solution to be hydrolyzed is a titanium sulphate solution it may prove desirable to reverse this procedure, that is, to add the titanium salt solution to the nucleating composition. In this manner there is obtained products possessing the maximum tinting strength and best color from titanium sulfate solutions.

V. CONCENTRATION OF TITANIUM IN THE HYDROLYSIS MIXTURE OF NUCLEATING COMPOSITION AND TITANIUM SALT SOLUTION

In the practice of the invention the nucleating efficiency and the quality of the products obtained are influenced by the concentration of titanium in the hydrolysis mixture. By hydrolysis mixture we mean the mixture of hydrolyzable titanium salt solution and nucleating composition, since the addition of the nucleating composition to the titanium salt solution adds titanium to the mixture which is recoverable in the hydrolysis. The concentration is here expressed as concentration of titanium in the mixture of nucleating composition and hydrolyzable titanium salt solution. It has been found that the optimum results are obtained when the hydrolysis mixture contains between about 80 to about 200, preferably about 125 to about 150 grams of titanium calculated as titanium dioxide, $TiO_2$, per liter.

Figure 5:
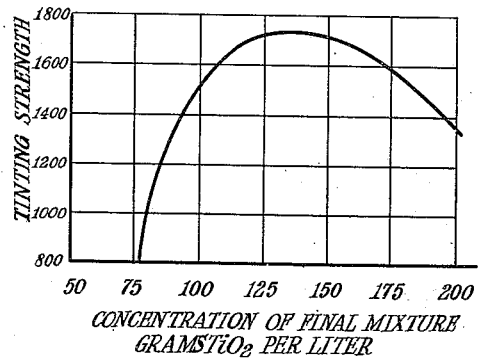

The effect of concentration of titanium in the hydrolysis mixture is shown on curve 5 of Fig. 5. The ordinate of curve 5 represents tinting strength as determined by the Reynolds method while the abscissa represents concentration of titanium calculated as grams $TiO_2$ per liter in the mixture. It will be observed that the highest tinting strength is obtained when using hydrolysis mixtures having concentrations of titanium between about 80 and about 200, preferably about 125 to about 150 grams of titanium calculated as $TiO_2$ per liter, derived both from the nucleating composition and from the hydrolyzable titanium salt solution.

VI. BASICITY, I. E., RATIO OF TITANIUM TO ACID IN THE HYDROLYSIS MIXTURE OF SALT SOLUTION AND NUCLEATING COMPOSITIONS

We have found that the basicity of the hydrolyzable salt solution is not an important factor in the practice of our invention. The hydrolyzable salt solution may be normal, i. e., contain four mol equivalents of hydrochloric acid or two mol equivalents of sulfuric acid to each mol equivalent of titanium dioxide in solution. In the case of titanium tetrachloride, direct solution of commercial anhydrous titanium chloride will usually result in a slight loss of hydrochloric acid as vapor thus giving a slightly basic solution. However, whether or not such loss occurs there is no advantage gained by neutralizing these solutions chemically. On the other hand, titanium sulfate solutions, which are usually obtained by dissolution of ilmenite in sulfuric acid, obviously may be more economically obtained as basic solutions and such, therefore, would be preferred.

VII. QUANTITY OF NUCLEATING COMPOSITION AND CONCENTRATION OF TITANIUM THEREIN TO BE EMPLOYED IN THE HYDROLYSIS OF THE TITANIUM SALT SOLUTION

Both the concentration of titanium in the nucleating composition as well as the amount of nucleating composition employed in the invention appear to have a relation to nucleating efficiency and quality of products obtained.

Figure 6:
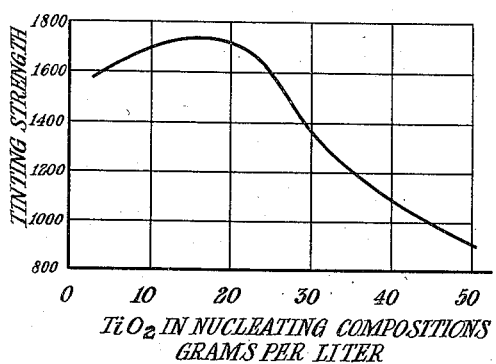
Figure 7:
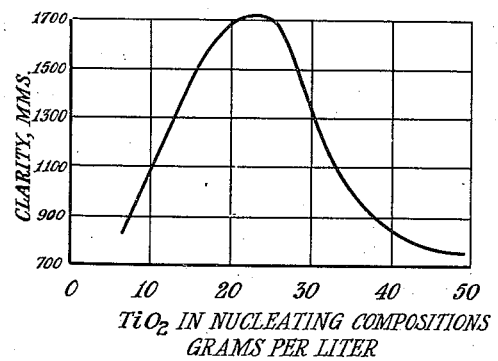

As regards titanium concentration in the nucleating composition it has been found that best results are obtained when employing a nucleating composition containing between about 5 to about 30 grams of titanium calculated as titanium dioxide, $TiO_2$, per liter, preferably between about 10 and about 20 grams $TiO_2$ per liter. Curve 6, Fig. 6 shows the relation between quality of products obtained in the practice of the invention and concentration of titanium calculated as $TiO_2$, in the nucleating composition. The ordinates of curve 6, Fig. 6 represent tinting strength as determined by the Reynolds method while the abscissae represents titanium concentration of the nucleating composition calculated as grams $TiO_2$ per liter. It is interesting to note that, as in the curve establishing the optimal neutralization (Fig. 1), maximum clarity of the heat-treated nuclear solution is observed at those concentrations of titanium in the nuclear solution which give final products of the highest tinting strength (see Fig. 7, curve 7). It is evident that those workers of the prior art who were seeking to prepare colloids which were very nearly of a discrete particle size, such as are obtained by the heat-treatment of basic solutions of ortho-titanic acid, overlooked the possibility, which we have discovered, that titanium chloride solutions in which the titanium micelles have aggregated to a relatively low degree may have an even greater nucleating efficiency, both as to time required to complete thermal precipitation and as to quality of final product.

When employing nucleating compositions containing the preferred concentration of titanium it is preferable that the titanium added in the nucleating composition should constitute between about 1.0 percent and about 10.0 percent of the total titanium present in the hydrolysis mixture, preferably between about 4 percent and about 5½ percent.

Figure 8:
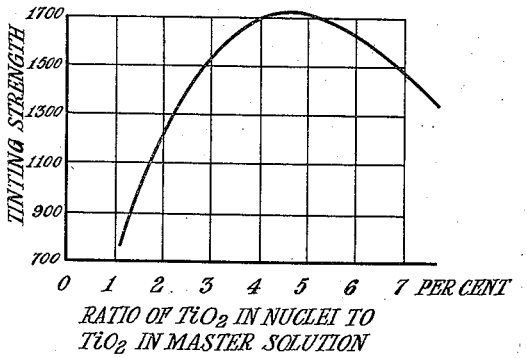

Curve 8, Fig. 8 shows the relation between quality of the products obtained from the invention and the ratio of titanium added in the nucleating composition to the titanium present in the hydrolyzable titanium salt solution, in this instance a titanium tetrachloride solution. The ordinates of curve 8, Fig. 8 represents tinting strength as determined by the Reynolds method while the abscissae represent the percentage of the total titanium in the hydrolysis mixture represented by the titanium added with the nucleating composition calculated as $TiO_2$.

The foregoing remarks give in detail the salient features of the invention in such terms as will enable those skilled in the art to practice the invention. It will be understood that certain variables may enter into the practice of the invention, depending upon the nature of the hydrolyzable titanium salt solution, time and temperature of heating, concentration of the hydrolyzable salt solution and the nucleating composition, basicity of the hydrolyzable salt solution, etc. Thus, if a titanium sulphate solution is to be hydrolyzed using a ratio of nucleating composition of the present invention the titanium salt solution may vary somewhat as may also vary the concentration of titanium in the nucleating composition and the concentration of titanium in the hydrolysis mixture; but those skilled in this art will readily be able to determine with the aid of the directions herein given the optimum conditions for the practice of the invention.

According to the present invention the thermal hydrolysis of the mixture of nucleating composition and hydrolyzable titanium salt solution is completed in a very much shorter time than is required in the ordinary prior art hydrolysis procedures. Thus, when practicing the present invention we have found that a hydrolysis carried out at the boiling point of the hydrolysis mixture for about 30 minutes is usually sufficient to precipitate over 97 percent of the titanium from solution. As a matter of fact it has been found in many instances that boiling the hydrolysis mixture for only 15 minutes yields recoveries of about 97 percent and only in rare instances is it necessary to exceed a boiling treatment for about 1 hour.

For illustrative purposes, the following examples describe adaptations of the invention to the hydrolysis of titanium solutions.

*Example 1*

A master solution of titanium tetrachloride was prepared by running crude commercial anhydrous titanium tetrachloride slowly into a weighed quantity of cracked ice until the weight was doubled. The temperature was held below 35° C. during the addition. Zinc was added to reduce the solution to a content of between about 1 to 3 grams per liter of reduced titanium, calculated as $TiO_2$. The solution had a specific gravity of about 1.5.

Forty-three cc. of this master solution containing a total of 15 grams $TiO_2$ was placed in a suitable vessel and 6.9 grams of hydrated lime, equivalent to 1 mol HCl per $TiCl_4$ molecule, was added with agitation. The resulting partially neutralized solution was clear; it was diluted to 1 liter, and heated at 85° C. for 10 minutes and then cooled to room temperature.

Three hundred cc. of the master solution was placed in a precipitation flask equipped with means for agitation and a reflux condenser and 300 cc. of the nucleating composition was slowly added at room temperature. To the mixture was then added 150 cc. of water. The ratio of titanium in the nucleating composition was between about 4 to 5 parts per 100 parts of titanium in the titanium tetrachloride solution. The mixture was then heated to boiling. A yield of about 97 percent was obtained in about 15 minutes but the boiling was continued for 1 hour. The precipitated hydrous titanium oxide was washed with water acidified with sulfuric acid and calcined at a temperature of about 800° C. for one hour. The tinting strength of the resulting product after the usual pulverization treatment was 1750.

*Example 2*

6.9 grams of hydrated lime were stirred into 43 cc. of a titanium tetrachloride solution containing approximately 15 grams titanium, calculated as $TiO_2$, and 24 grams hydrochloric acid. After the reaction was complete, the resulting clear solution was diluted with water to 1000 cc. The solution was then heated to 75° C. in about 15 minutes and held at this temperature while constantly stirring for about 1 hour and then cooled to room temperature.

Three hundred cc. of a titanium tetrachloride solution of the composition used for preparing the nuclear solution was placed in a suitable vessel equipped with an agitator and 300 cc. of the nuclear solution was slowly added after which an addition of 150 cc. of water was made. The mixture was heated to the boiling point in about 30 minutes and heated at the boiling temperature under a reflux condenser for 2 hours. The resulting precipitated hydrous titanium dioxide was calcined at 800° C. for about 1 hour. The resulting titanium dioxide possessed a very good color and had a tinting strength value, as determined by the Reynolds method, of 1725.

*Example 3*

A master solution of titanium tetrachloride was prepared in the manner described under Example 1. It contained per liter 338 grams titanium, calculated as $TiO_2$, 550 grams hydrochloric acid and 1 gram of reduced titanium, calculated as $TiO_2$.

7.5 grams of sodium hydroxide as a 20 percent aqueous solution, was added with stirring to 44 cc. of the above described titanium tetrachloride master solution. After reaction was complete, the resulting clear product was diluted with water to 1000 cc. The resulting solution was heated to 85° C. in 20 minutes and held at that temperature for 10 minutes while constantly agitating it. Thereafter it was cooled to room temperature.

Four hundred cc. of the above described master solution was placed in a suitable vessel equipped with means for agitation in a reflux condenser. Four hundred cc. of the titanium nuclear solution was slowly added after which 200 cc. of water was added. The mixture was heated to the boiling point in about 20 minutes and boiled for 2 hours. The precipitated hydrous titanium oxide was calcined at about 800° C. for about 1 hour. It had good color and a tinting strength value, according to the Reynolds method, of 1700.

Example 4

A master solution of titanium tetrachloride was prepared in the manner described in Example 1. It contained per liter 343 grams of titanium, calculated as $TiO_2$, 562 grams hydrochloric acid and 3 grams reduced titanium, calculated as $TiO_2$. 29.4 grams of barium hydroxide, $Ba(OH)_2 \cdot 8H_2O$, dissolved in 200 cc. of water was added to 44 cc. of the titanium tetrachloride master solution. After the reaction was complete the product was diluted with water to 1000 cc. The resulting solution was heated rapidly to 85° C., held between 85°–90° C. for about 10 minutes and cooled to room temperature. Four hundred cubic centimeters of the titanium tetrachloride master solution was placed in a suitable vessel equipped with means for agitation in a reflux condenser and 400 cc. of the nuclear solution was slowly added thereto. Thereafter 200 cc. of water were added. The mixture was heated to the boiling point in 15 minutes and boiled for 2 hours. The precipitated hydrous titanium oxide was calcined at about 800° C. for about 1 hour. It had good color, high brightness and a tinting strength value, according to the Reynolds method, of over 1600.

Example 5

The nuclear solution was prepared in the following manner: 6.9 grams of hydrated lime was added to 44 cc. of titanium tetrachloride solution containing per liter about 15 grams titanium, calculated as $TiO_2$, and 25 grams hydrochloric acid. After reaction the resulting solution was diluted with water to 1000 cc. and filtered. The solution was heated to 85° C. in about 15 minutes, held between 85°–90° C. for 10 minutes and cooled to room temperature. Stirring was maintained throughout the entire heat treatment.

The hydrolysis solution was a titanium sulfate solution obtained by dissolving ilmenite in sulfuric acid. It had the following composition:

Titanium (tetravalent), as $TiO_2$
  Grams per liter__ 150
$H_2SO_4$ (free and combined with Ti)
  do____ 290
Titanium (trivalent), as $TiO_2$_____do____ 3
Specific gravity at room temperature____ 1.42

The solution also contained a part of the iron originally present in the ore as ferrous sulfate.

Four hundred cc. of this titanium sulfate solution was placed in a suitable vessel equipped with means for mechanical agitation and a reflux condenser and 200 cc. of the above described titanium nuclear solution was slowly added thereto. The addition was carried out at room temperature. The mixture was heated to boiling in about 25 minutes and boiled for 2 hours. The rate of hydrolysis of the titanium sulfate solution was greatly accelerated. Upon calcination of the precipitated hydrous titanium oxide, the product obtained had properties comparable to those obtained from Examples 1–4.

The present invention does not require any material deviation from the standard calcination treatments nor any deviation from the usual treatments after calcination. As a matter of fact, the hydrous titanium oxide obtained from the present invention may be calcined at somewhat lower temperatures and for shorter times than is required to develop maximum tinting strength for the hydrous titanium oxide obtained from previous processes. The products of the present invention are outstanding because of their high tinting strength. They have good color, texture and other pigment properties.

The foregoing description has been given for clearness of understanding and no undue limitations should be deduced therefrom.

We claim:

1. A method for the preparation of nucleating compositions used in the hydrolytic precipitation of hydrous titanium oxide from titanium salt solutions which comprises heating a titanium tetrachloride solution containing between approximately 2.75 and 3.25 hydrochloric acid mol equivalents per mol of titanium and between approximately 5 grams and approximately 30 grams of titanium, calculated as $TiO_2$, per liter until a degree of opalescence develops substantially equal to the degree of opalescence produced at the end of approximately 10 minutes heating at temperatures between 80° C. and 90° C. of a titanium tetrachloride solution having a titanium content, calculated as $TiO_2$, and a hydrochloric acid content within the said ranges.

2. A method for the preparation of nucleating compositions useful in the hydrolytic precipitation of hydrous titanium oxide from titanium salt solutions which comprises adding to a titanium tetrachloride solution a sufficient amount of an alkaline-reacting neutralizing agent to neutralize between about 0.75 and approximately 1.25 hydrochloric acid mol equivalents per mol of titanium tetrachloride contained in the said solution, diluting the partially neutralized solution with water until the concentration of titanium therein, calculated as $TiO_2$, is between approximately 5 grams and approximately 30 grams per liter and heating this solution until a degree of opalescence develops substantially equal to the degree of opalescence produced at the end of approximately 10 minutes' heating at temperatures between 80° C. and 90° C. of a titanium tetrachloride solution having a titanium content, calculated as $TiO_2$, and a hydrochloric acid content within the said ranges.

3. A method for the preparation of nucleating compositions useful in the hydrolytic precipitation of hydrous titanium oxide from titanium salt solutions which comprises heating a titanium tetrachloride containing between approximately 2.75 and approximately 3.25 hydrochloric acid mol equivalents per mol of titanium, and in which the titanium content, calculated as $TiO_2$, is between approximately 5 grams and approximately 30 grams per liter until a degree of opalescence develops such that when the solution is tested in a Jackson-type turbidimeter using a 3.5 volt—0.5 ampere light source covered with four sheets of 16 pound white sulfite paper a depth of solution between approximately 150 mm. and approximately 200 mm. will be required for the extinction of the light source.

4. A method for the preparation of nucleating compositions useful in the hydrolytic precipitation of hydrous titanium oxide from titanium salt solutions which comprises adding to a titanum tetrachloride solution a sufficient amount of an alkaline-reacting neutralizing agent to neutralize between approximately 0.75 and approximately 1.25 hydrochloric acid mol equivalents per mol of titanium tetrachloride contained in the said solution, diluting with water the partially neutralized titanium tetrachloride solution until the content of titanium, calculated as $TiO_2$, is between approximately 10 grams and approximately 20 grams per liter, and heating the diluted solution for approximately 10 minutes at a temperature between approximately 80° C. and 90° C.

5. A method for the preparation of nucleating compositions useful in the hydrolytic precipitation of hydrous titanium oxide from titanium salt solutions which comprises adding to a titanium tetrachloride solution a sufficient amount of lime to neutralize between approximately 0.75 and approximately 1.25 hydrochloric acid mol equivalents per mol of titanium tetrachloride contained in the said solution, diluting with water the partially neutralized titanium tetrachloride solution until the content of titanium calculated as $TiO_2$, is between approximately 10 grams and approximately 20 grams per liter, and heating the diluted solution for approximately 10 minutes at a temperature of approximately 85° C.

6. As a new composition of matter a slightly opalescent, basic titanium hydrochloric acid solution in which the chlorine content, free and combined with titanium is between approximately 2.75 and 3.25 mol equivalents per mol of titanium, calculated as $TiO_2$, and which contains, per liter, between approximately 5 grams and 30 grams titanium calculated as $TiO_2$ as dispersed colloidal particles unseparable from the said solution by ordinary filtration methods, which when tested in a Jackson-type turbidimeter using a 3.5 volt—0.5 ampere light source covered with four sheets of 16 pound white sulfite paper, will show an extinction of the said light source at a depth of solution between approximately 150 mm. and approximately 200 mm. and which possesses the property of accelerating the thermal hydrolytic decomposition of titanium salt solutions.

7. As a new composition of matter a slightly opalescent, basic titanium hydrochloric acid solution in which the chlorine content, free and combined with titanium, is between approximately 2.75 and approximately 3.25 mol equivalents per mol titanium, calculated as $TiO_2$, and which contains, per liter between approximately 10 grams and approximately 20 grams titanium, calculated as $TiO_2$, as dispersed colloidal particles unseparable from the said solution by ordinary filtration methods which when tested in a Jackson-type turbidimeter using a 3.5 volt—0.5 ampere light source covered with four sheets of 16 pound white sulfite paper, will show an extinction of the said light source at a depth of solution between approximately 150 mm. and approximately 200 mm. and which possesses the property of accelerating the thermal hydrolytic decomposition of titanium salt solutions.

8. A method for the hydrolytic precipitation of hydrous titanium oxide from titanium salt solutions which comprises admixing with a titanium salt solution a sufficient amount of a nucleating composition prepared according to the method of claim 1 so that the titanium content of the mixture, calculated as $TiO_2$, is between approximately 80 grams and approximately 200 grams per liter of which between approximately 1 percent and approximately 10 percent of the total titanium is derived from the nucleating composition, and heating the mixture at temperatures up to the boiling point thereof until substantially all of the titanium has been hydrolytically precipitated.

9. A method for the hydrolytic precipitation of hydrous titanium oxide from titanium salt solutions which comprises admixing with a titanium salt solution a sufficient amount of a nucleating composition prepared according to the method of claim 4 so that the titanium content of the mixture, calculated as $TiO_2$, is between about 125 to 150 grams per liter of which between approximately 4 percent and approximately 5½ percent of the total titanium is derived from the nucleating composition, and heating the mixture at temperatures up to the boiling point thereof until substantially all of the titanium has been hydrolytically precipitated.

10. A method for the hydrolytic precipitation of hydrous titanium oxide from titanium salt solutions which comprises admixing with a titanium chloride solution a sufficient amount of a nucleating composition prepared according to the method of claim 1 so that the titanium content of the mixture, calculated as $TiO_2$, is between approximately 80 grams and approximately 200 grams per liter of which between approximately 1 percent and approximately 10 percent of the total titanium is derived from the nucleating composition, and heating the mixture at temperatures up to the boiling point thereof until substantially all of the titanium has been hydrolytically precipitated.

JELKS BARKSDALE.
WALTER W. PLECHNER.